Sept. 20, 1938.  W. H. SPINDLER  2,130,973
CHOKELESS DRAG FEED
Filed March 24, 1938  2 Sheets-Sheet 1
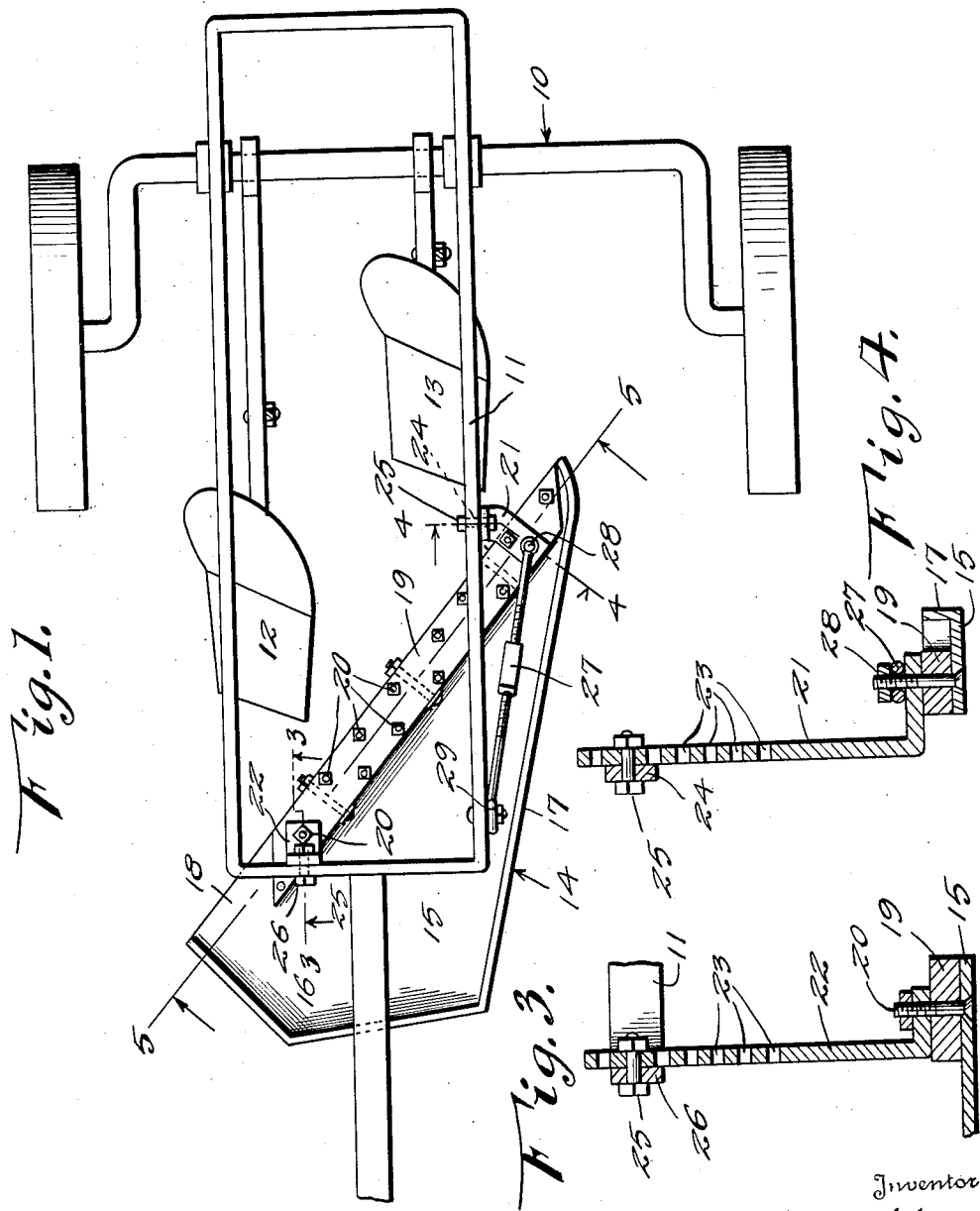
Inventor
W. H. Spindler
By L. F. Randolph
Attorney Sept. 20, 1938.　　　W. H. SPINDLER　　　2,130,973
CHOKELESS DRAG FEED
Filed March 24, 1938　　　2 Sheets-Sheet 2
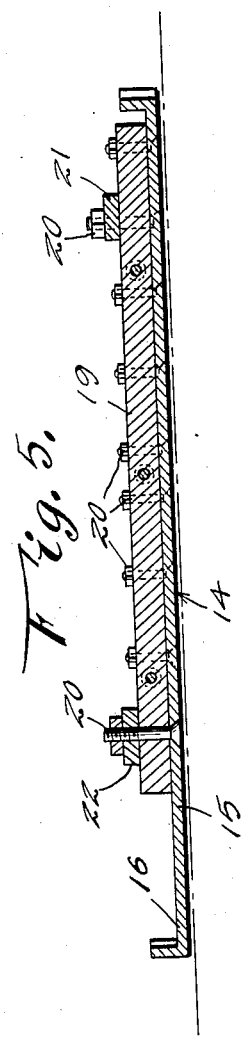
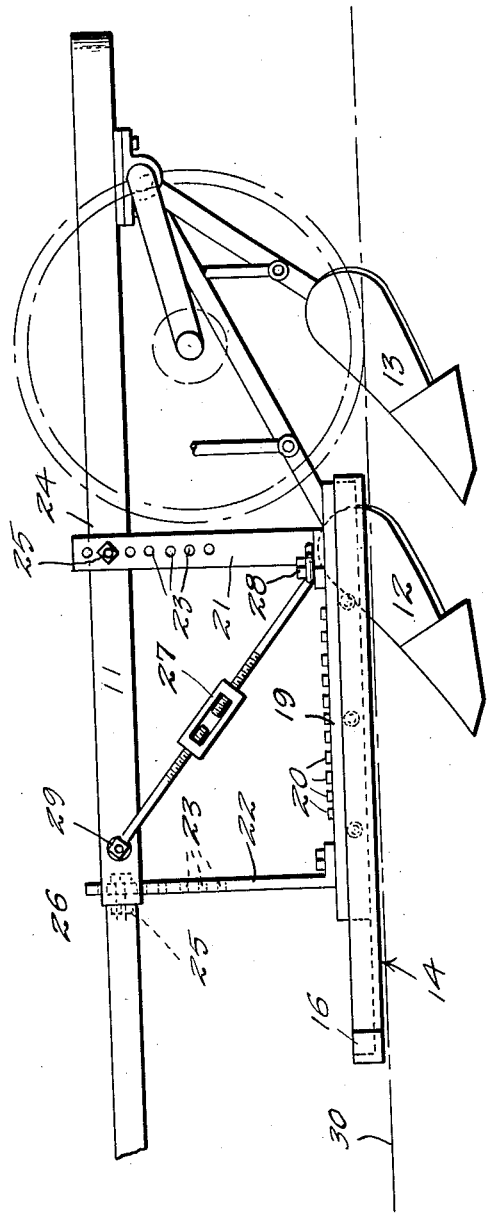
Inventor
W. H. Spindler
By L. F. Randolph
Attorney Patented Sept. 20, 1938

2,130,973

UNITED STATES PATENT OFFICE 2,130,973

CHOKELESS DRAG FEED

William H. Spindler, Chillicothe, Ohio

Application March 24, 1938, Serial No. 197,920

6 Claims. (Cl. 97—193)

This invention relates to a chokeless drag feed attachment for a gang plow.

It is an aim of this invention to provide a drag attachment adapted to be removably connected to the frame of a gang plow and disposed in front of the shares thereof close to the ground to flatten any vegetation which might tend to clog or choke the shares.

It is a further object of this invention to provide a device which may be readily attached to various forms of gang plows, and which may be adjustably mounted depending upon the height of the plow frame and the depth of the shares to permit it to lightly drag the earth in front of the shares to prevent weeds or the like from becoming entangled on the plow standards.

A further object of the invention is to provide a tapered blade forming the drag, having upturned edges to prevent it from digging into the earth and disposed at an angle to the frame so as to be spaced substantially an equal distance from each of the shares with which it is adapted to function.

Other objects and advantages of the invention will hereinafter become more fully apparent from the following description of the drawings which illustrate a preferred form of the invention, and wherein:—

Figure 1 is a top plan view of a gang plow showing the invention attached thereto, Figure 2 is a side elevational view of the same, Figure 3 is an enlarged vertical sectional view taken on the line 3—3 of Figure 1, Figure 4 is a similar view taken on the line 4—4 of Figure 1, and Figure 5 is a vertical sectional view taken on the line 5—5 of Figure 1.

Referring more particularly to the drawings, wherein like reference characters designate like or corresponding parts throughout the different views, 10 designates generally a wheeled gang plow having a rectangular frame 11 and the plowshares 12 and 13, the latter being disposed to one side of and to the rear of the share 12. The plow 10 is of conventional form and constitutes no part of the present invention, but is merely shown to illustrate the attachment which will hereinafter be described.

The invention, designated generally 14 is a chokeless drag feed attachment adapted for use with any gang plow of the type illustrated. The attachment comprises a blade 15 having a wide angular shaped end 16, the edge of which is upturned, and a tapered side 17 likewise having an upturned edge. Secured along the remaining side 18 of the blade 15 is a beam 19 secured to the upper side of the blade by means of the fastenings 20, to reinforce and brace the blade 15.

Secured to certain of the fastenings at opposite ends of the beam 19, are hangers 21 and 22 which project upwardly, as best seen in Figure 2, and which are provided with spaced openings 23 in their upper ends. Strap 21 is adapted to be adjustably secured at 24 on the frame 11 by the fastening 25, and a corresponding fastening 25 is adapted to adjustably secure strap 22 to the front part of frame 11 at the point 26. The fastenings 25 may engage any one of the openings 23 in the hangers 21 and 22 to adjust the elevation of the drag 14.

A turnbuckle brace 27 is secured at 28 to the rear of the beam 19, and to the side of the frame 11 at the point 29. Brace 27 is adapted to cooperate with the hangers 21 and 22 to provide a three point support for the drag 14 to rigidly retain it relatively to the frame 11.

As best seen in Figure 1, the drag 14 is disposed at an angle to the frame 11 with the end 16 to the front and with the side 18 disposed so that its edge is substantially the same distance from the leading edges of the shares 12 and 13. In this way the rolled edges of end 16 and side 17 precede the shares 12 and 13, when the plow 10 is in operation. As best seen in Figure 2, the blade 15 is mounted so that it is slightly above the ground level designated by the line 30 to flatten the vegetation in front of the shares so that weeds or the like will not become entangled on the shares and their standards to interfere with the efficient operation of the plow. The blade 15 is elevated slightly from the ground level 30 so as not to drag and prevent efficient operation of the plow, and has its end 16 and edge 17 which are the leading edges upturned so as to prevent the drag from digging into uneven portions in the earth surface 30. The plow 10 is usually provided with rolling cutters, not shown, which are arranged in front of each of the shares and when such cutters are used the beam 19 will be disposed just in front of these cutters.

Where more than two shares are employed, the drag 14 can be enlarged to span the additional shares, or a plurality of the drags may be used each functioning with two or more of the shares. The supporting means for the blade 15 may also be modified to adapt the drag 14 to gang plows having a differently shaped frame 11. Various other modifications and changes may likewise be made and are contemplated, and the right is reserved to make such variations and changes as fall within the spirit and scope of the invention as hereinafter defined by the appended claims.

I claim as my invention:—

1. A device of the class described comprising a horizontally disposed blade, a beam secured to and extending along a portion of the upper side of said blade, and supporting members secured to said beam and projecting upwardly therefrom and adapted to be removably secured to the frame of a gang plow to mount the device in front of the shares of the plow.

2. In a device of the class described, a horizontally disposed plate, a beam secured along one edge of said plate, hangers secured to said beam and projecting upwardly therefrom and adapted to be secured to the frame of a gang plow, and said plate having its remaining edges turned upwardly to engage the vegetation in front of the shares of said plow.

3. An attachment for gang plows comprising a substantially triangular shaped and horizontally disposed blade, a beam secured along one edge of said blade, hangers secured to said beam and projecting upwardly and adapted to be adjustably connected to a plow frame to support said blade in front of the plowshares, and an adjustable brace member connected to said beam and frame.

4. An attachment for gang plows comprising a substantially triangular shaped and horizontally disposed blade having upturned leading edges, and means to adjustably mount said blade on a plow frame slightly above the ground level, diagonally to the plowshares and spaced therefrom.

5. In a chokeless drag feed attachment for gang plows, a horizontally disposed plate, a beam secured along one edge of said plate, and supporting means connected to said beam and adjustably connected to a plow frame to support the plate in front of the plowshares and slightly above the ground level, said plate being tapered from its leading end and disposed in the path of a plurality of plowshares.

6. In an attachment for gang plows, a horizontally disposed blade having a plurality of upturned leading edges, a beam secured to said blade, hangers secured to said beam and adjustably connected to a plow frame to support the blade in position at an angle to and in front of the plowshares, whereby the earth in front of the shares will be dragged.

WILLIAM H. SPINDLER.